Fig.1.

United States Patent Office 3,034,296
Patented May 15, 1962

3,034,296
CONTROL MECHANISM FOR AIRCRAFT JET-PROPULSION ENGINES HAVING MEANS FOR PRODUCING FORWARD AND REVERSE PROPULSIVE THRUSTS
John Michael Storer Keen, Allestree, Derby, and Rowan Herbert Colley, Sunny Hill, Derby, England, assignors to Rolls-Royce Limited, Derby, England, a British company
Filed Mar. 23, 1959, Ser. No. 801,047
Claims priority, application Great Britain Apr. 2, 1958
11 Claims. (60—35.54)

This invention comprises improvements in or relating to control mechanisms for aircraft jet-propulsion engines and more particularly to control mechanisms for aircraft jet-propulsion engines of the kind having an exhaust assembly capable of producing a normal thrust for forward propulsion purposes and a reverse thrust for braking purposes.

According to the present invention a control mechanism, for an aircraft jet-propulsion engine of the kind having an exhaust assembly including jet-reversing means adjustable between a normal thrust position in which exhaust gas issues as a rearwardly-directed jet for propulsion purposes and a reverse thrust position in which the exhaust gas issues as a forwardly directed jet for braking purposes, comprises engine fuel supply control means adjustable between idling and full power settings, means operative in a low power setting of the fuel supply control means to permit selection of and to initiate adjustment of the position of the jet-reversing means, and limiting means actuated by the jet-reversing means as it moves from one position to the other and operative to limit adjustment of the fuel supply control means away from the low power setting except when the jet-reversing means is substantially in the selected position.

According to a feature of this invention, the means operative to permit selection of and to initiate adjustment of the position of the jet-reversing means may include a member connected to move on adjustment of the fuel supply control means, the movement of the member being in one sense from a position corresponding to the idling setting of the fuel control means on increasing the fuel supply for normal thrust operation and being in the opposite sense from the position on increasing fuel supply for reverse thrust operation, the limiting means limiting movement of said member away from the position corresponding to idling setting except when the jet-reversing means is substantially in its selected position, the connection between the member and the fuel supply control means being such that adjustment of the fuel supply control means is correspondingly limited.

In one construction according to the above feature of this invention, the fuel supply control means includes a lever arrangement adjustable to vary the fuel supply and having two ranges of movement from an idling setting respectively for engine operation with normal thrust and for engine operation with reverse thrust, said member is a selector cam rotatable from a position corresponding to the idling setting of the lever arrangement in one sense on adjustment of the lever arrangement in one of said ranges and in the opposite sense on adjustment of the lever arrangement in the other range, and the limiting means includes a follow-up cam rotatable by the jet-reversing means as it moves from one of its positions to the other, said cams co-operating one with the other to limit movement of the selector cam and thus of the lever arrangement except when the jet-reversing means is adjacent its position corresponding to the range in which the lever is to be moved, the selector cam also being arranged by its movement to initiate adjustment of the jet-reversing means. For instance, it may be arranged that, when the jet-reversing means is in its reverse thrust position, a normal thrust setting of the jet-reversing means is selected by adjustment of the selector cam into the position corresponding to idling setting of the lever arrangement, and that, when the reversing means is in its normal thrust position, reverse thrust is selected by adjustment of the lever arrangement in the reverse thrust range of its movement to a limited extent from the position corresponding to idling setting, and that the follow-up cam prevents movement of the lever in the normal thrust range from the idling position until the reversing means is in the forward thrust position and in the reverse thrust range beyond said limited extent until the reversing means is in the reverse position. The selector cam by its movement may adjust a selector valve supplying pressure fluid to operating rams for actuating the reversing means.

According to another preferred feature of this invention, the control mechanism is also arranged so that in the event of non-selected movement of the reversing means from one of its positions to the other position whilst the fuel supply control means is in a setting other than idling setting, the fuel supply control means is moved by said non-selected movement towards its idling setting. In the above described embodiment this may be achieved by arranging that the follow-up cam on being rotated by such non-selected movement drives the selector cam towards its position corresponding to the idling setting of the fuel control lever arrangement so moving it towards its idling setting.

According to another feature of this invention, where the reversing means comprises reversing doors movable into the gas flow through the jet pipe to obtain reverse thrust and movable out of the gas flow to obtain normal thrust, the control mechanism comprises pressure-fluid-operated rams connected to adjust the reversing doors, a selector valve moved by the selector cam and controlling supply of pressure fluid to the rams, an interlock and sequencing valve in supply connections between the selector valve and the rams, the interlock and sequencing valve being displaceable between normal thrust and reverse thrust positions by the pressure fluid following appropriate adjustment of the selector valve, and an interlock mechanism connected between the reversing doors and the interlock and sequencing valve such that, on adjustment of the selector valve to select reverse thrust, the pressure fluid supply to the reversing door rams is effected only after movement of the sequencing valve into the reverse thrust position and such that, on adjustment of the selector valve to select normal thrust, the rams operate to move the reversing doors to their normal thrust position before movement of the interlock and sequencing valve to its normal thrust position is permitted.

The interlock mechanism may for instance comprise a cross-head coupled to and movable with the reversing doors, a lever rocked by movement of the interlock and sequencing valve and carrying an abutment which, in the normal thrust position of the valve, prevents movement of the cross-head and thus of the doors from the normal thrust position and which on movement of the valve to its reverse thrust position frees the cross-head for movement, and a part carried by the cross-head and co-operating with the abutment to prevent movement of the interlock and sequencing valve into its normal thrust position until the reversing doors have moved to the normal thrust position.

When the reversing means also includes nacelle doors covering reverse thrust gas outlets in a nacelle enclosing the reversing means, which nacelle doors are open in reverse thrust operation and are closed in forward thrust operation, the control mechanism preferably comprises further rams for actuating the nacelle doors, the nacelle door rams and the interlock and sequencing valve being so connected to the selector valve that, on adjustment of the selector valve to select reverse thrust, the pressure fluid supply to move the interlock and sequencing valve is effected by movement of the nacelle doors to their open position and that, on adjustment of the selector valve to select normal thrust, the supply of pressure fluid to the nacelle door rams is effected by movement of the interlock and sequencing valve from its reverse thrust position. In this way in adjusting the reversing means from the normal thrust position to the reverse thrust position, the interlock is held engaged preventing movement of the reversing doors until released by movement of the rams operating the nacelle doors into the open position, and in changing from reverse thrust position to normal thrust position, the locking and sequencing valve cannot be operated to supply pressure fluid to the nacelle door rams until the reversing doors have reached their forward thrust position.

Some embodiments of control mechanism according to this invention will now be described with reference to the accompanying drawings, in which.

Figure 1:
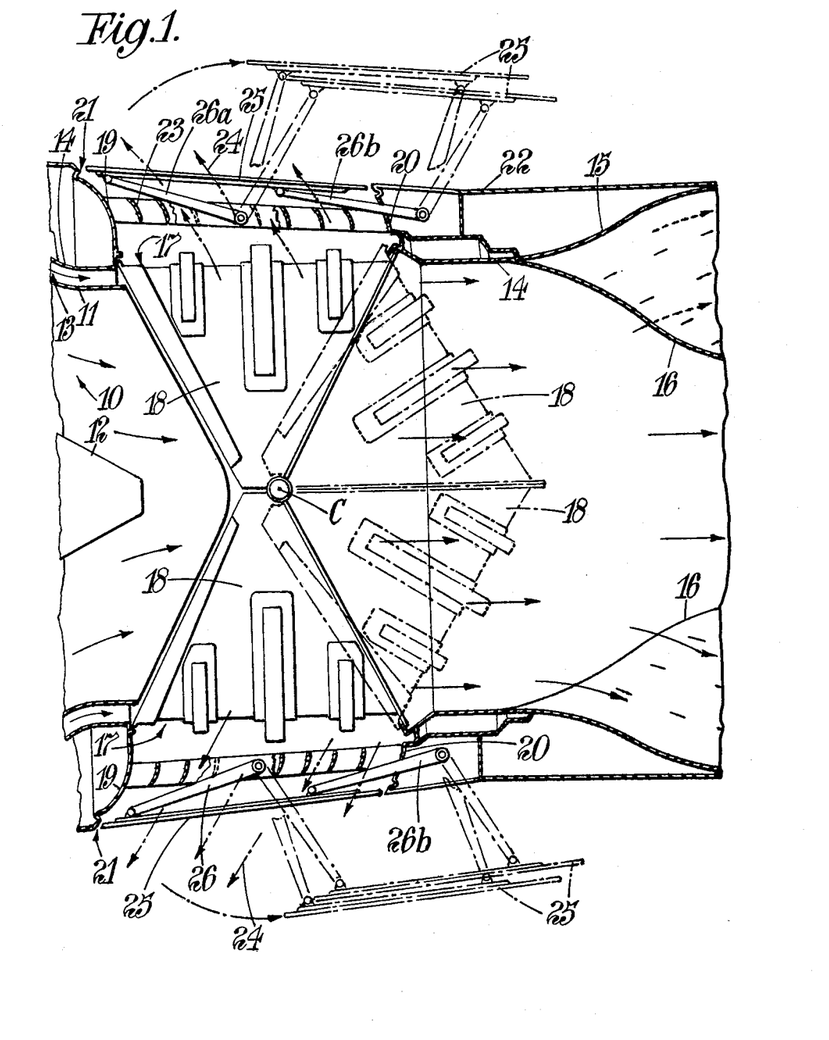
FIGURE 1 illustrates part of an exhaust system for a gas-turbine engine, the exhaust system including means for obtaining reverse thrust.

The exhaust system shown in FIGURE 1 is suitable for use with a by-pass type gas-turbine engine and comprises an exhaust duct 10 defined between an outer duct wall 11 and an exhaust cone 12, and a by-pass air duct 13 defined between the wall 11 and a further surrounding wall 14. The wall 11 terminates substantially in a plane at right angles to the axis of the exhaust cone 12 and containing the apex of the exhaust cone 12, but the wall 14 extends downstream beyond the wall 11 towards a propulsion nozzle which is of the kind giving noise attenuation. The nozzle, part only of which is shown, comprises a tubular casing 15 and a series of, say six, radially-inwardly extending structures 16 angularly spaced around the nozzle so as to define peripherally of the nozzle a number of channels for the flow of exhaust gas.

The exhaust system also includes means for obtaining reverse thrust for braking purposes. This means comprises porting 17 formed in the wall 14 axially between the downstream end of the wall 11 and the nozzle 15, 16, a pair of reversing doors 18 which are pivoted at C about a diameter of the wall 14 to swing between a first position shown in full lines in FIGURE 1 in which they close off the ports 17 and permit exhaust gas and by-pass air to flow unobstructedly towards the nozzle 15, 16, and a second position, shown in chain lines in FIGURE 1, in which they uncover the porting 17 and block the rearward flow of exhaust gas and by-pass air towards the nozzle 15, 16 so that the exhaust gas and by-pass air flows through the ports 17 into forwardly-inclined ducts defined between walls 19, 20 to ports 21 in a nacelle 22 enclosing the exhaust system. The ducts house a series of deflector vanes 23 the purpose of which is to assist to impart to the exhaust gas and by-pass air issuing through the ports 21 in the nacelle 22 a forward component of velocity. The gas may issue for example as indicated by the chain dotted arrows 24.

When the reversing doors 18 are in the full line position shown in FIGURE 1, the ports 21 in the nacelle 22 are closed by nacelle doors 25 as indicated in full lines in FIGURE 1, and, when the reversing doors 18 are in their chain line position, the nacelle doors 25 are open, having been swung rearwardly to the right-hand chain line position illustrated. The nacelle doors 25 are mounted on swinging links pivoted to the fixed structure of the exhaust system, there being a pair of links 26a per door pivoted adjacent the mid point of the vanes 23 and a single link 26b per door rearwardly of the porting 21.

The swinging of the reversing doors 18 and of the nacelle doors 25 is effected by suitable rams, as will be more fully described below, and there is provided a control system for the operation of the rams such that, in changing from normal thrust operation to reverse thrust operation, the nacelle doors 25 are opened before the reversing doors 18 move from their full line position to their chain line position, so that, in changing from the reverse thrust operation to normal thrust operation, the reversing doors 18 move from their chain line position to their full line position before the nacelle doors 25 are closed, and so that in the event that the reversing doors 18 more from one position to the other, whilst the pilot's engine control lever 27 (FIGURE 2) is in or near a full power setting (either for normal thrust or reverse thrust) the lever 27 is automatically fed back towards its idling setting. Also during changeover from one thrust to the other the extent of power increase is limited.

Figure 2:
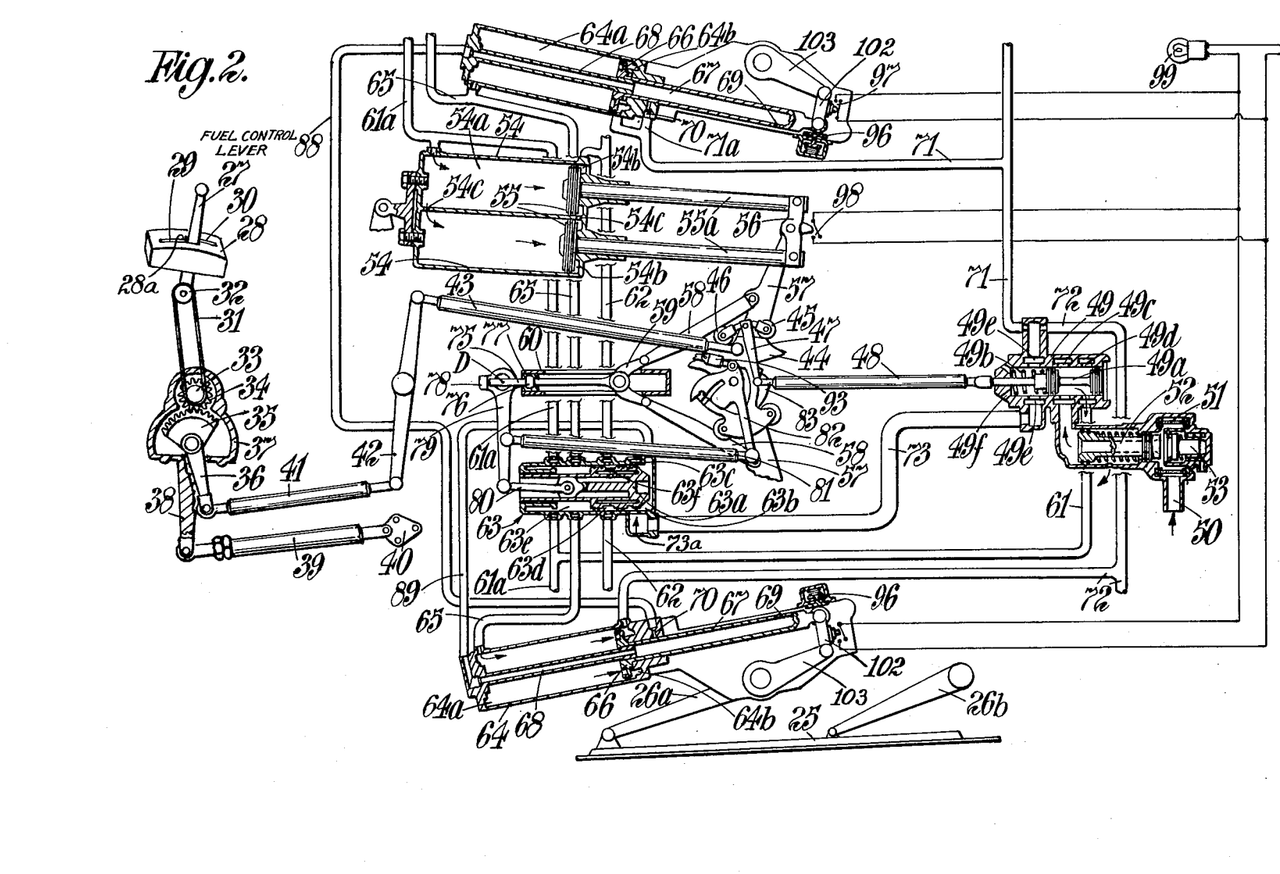
FIGURE 2 illustrates the embodiment of control system.

Referring now to FIGURE 2, the pilot's engine control lever 27 is shown as working in a gate 28 which has a slot 29 in which the lever 27 is moved for varying the power of the engine whilst normal thrust is being obtained, and a slot 30 in which the lever 27 is moved to vary the power output of the engine whilst reverse thrust is being obtained. The lever 27 is shown in the idling position and the two slot portions 29, 30 are joined by a step 28a at this position. To increase power the lever 27 is moved in the appropriate slot 29 or 30 from the idling position towards the opposite end of the slot. It will be understood that the form of pilot's control lever and gate illustrated may be replaced by any other suitable form of pilot's control.

The lever 27 is provided at 31 and carries a pulley or sprocket 32 over which runs a drive cable or chian leading to an input pulley or sprocket 33 of the reversing sequencing control mechanism shown.

The pulley or sprocket 33 has secured to it a gear 34 meshing with a quadrant gear 35 having in one with it a radius arm 36. The gear 34 and quadrant gear 35 are carried on a frame 37 which is pivoted to fixed structure of the aircraft to rock about the axis of the gear 34 and which has projecting from it an arm 38 pivoted to one end of a link 39, the opposite end of which is pivoted to a bracket 40 attached to the jet pipe casing. The link 39, the arm 38 and the bracket 37 provide a compensation so as to avoid malfunctioning of the control system due to variations in the relative positions of the aircraft structure and jet pipe casing caused for instance by relative thermal expansion or contraction.

Figure 3:
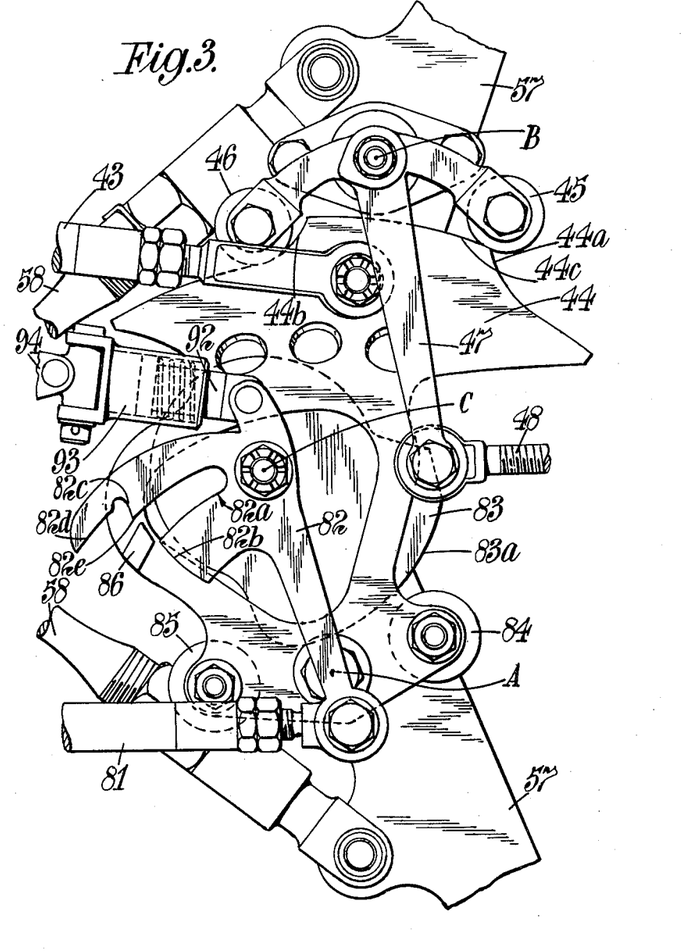
FIGURE 3 illustrates part of the control system shown in FIGURE 2 but drawn to a larger scale.

The end of the radius arm 36 is connected by a link 41 to one end of a lever 42, the opposite end of which is connected by a link 43 to a selector valve cam 44 which is shown to a larger scale in FIGURE 3. The selector valve cam 44 is pivoted to swing about an axis indicated in FIGURE 3 at point A, and, when the control lever 27 is moved in a direction from right to left, the selector valve cam 44 will be rocked in a clockwise direction about its pivot axis A and, when the lever 27 is moved from left to right, the selector valve cam will be rocked in an anti-clockwise direction.

The selector valve cam 44 has a pair of cam surfaces 44a, 44b joined by a circular arm cam surface 44c and the cam surfaces have co-operating with them a pair of rollers 45, 46 carried at the ends of a pair of oppositely-extending arms of an anchor-shaped lever 47, the third arm of which is connected by a link 48 to a selector valve 49 (FIGURE 2). When the selector valve cam 44 is rocked in an anti-clockwise direction from the position shown in FIGURE 3, the roller 45 will move from contact with the cam surface 44c onto the cam surface 44a and the cam surface 44b will lift the roller 46 so that it runs onto the left-hand end of the cam surface 44c so rocking the anchor-shaped lever 47 about its pivot B in a clockwise direction whereby movable valve member 49a of selector valve 49 is moved from the position shown in FIGURE 2 to the left into a second position of adjustment. Conversely, when the selector valve cam 44 is rocked in the clockwise direction, the anchor-shaped lever 47 is turned anti-clockwise and the selector valve 49 is moved into the position shown in FIGURE 2.

The selector valve 49 (FIGURE 2) controls the supply of pressure air to the operating rams for the nacelle doors 25 and for the reversing doors 18. High-pressure air which may be tapped from the engine compressor, is led to the valve 49 from an inlet connection 50 through a filter 51 and pressure-limiting valve 52. A blow-off valve 53 is provided upstream of the pressure-limiting valve 52 to limit the pressure supply to the control system should the pressure-limiting valve 52 fail to function. It is arranged that the ram system is large enough to provide sufficient forces to operate at the relatively low pressure obtainable in low power operation of the engine and the pressure-limiting and blow-off valves 52, 53 prevent overstressing of the ram system in high power operation of the engine.

The selector valve 49 has a movable valve member 49a connected to be moved by the link 48 against the action of a spring 49b. In the position of the movable valve member 49a shown in FIGURE 2, the pressure air supplied to the valve 49 enters the valve through ports 49c and flows through the space between a pair of lands on the valve member 49a to ports 49d and thus to a pipe 61. When the valve member 49a is moved to the left by the link 48 against the action of spring 49b, the right-hand land of the valve member 49a moves past the ports 49d and the space between the lands connects the ports 49c with ports 49e communicating with pipes 71, 72 and 73. In this latter position of the valve, the ports 49d are open to atmosphere and, in the first described position of the valve member 49a, the ports 49e are open to atmosphere through drillings 49f in the casing of the valve 49.

Each of the reversing doors 18 is operated by a pair of twin rams 54. Each twin ram 54 comprises a pair of cylinders containing pistons 55, the rods 55a of which are connected together by a cross tie 56 having a pivotal connection with the end of an operating arm 57 for the reversing door 18. One twin ram 54 of each pair is disposed on each side of the jet pipe adjacent the pivoted ends of the associated reversing door 18 and the operating arms 57 are connected to the associated reversing door 18 to project from it on the opposite side of its pivots. Thus, referring to FIGURE 1, if the porting 21 is in the port and starboard sides of the nacelle 22 then the operating arms 57 for the port reversing door 18 (the lower door 18 in the drawing) will extend upwardly towards the starboard side of the exhaust assembly and the operating arms 57 for the starboard reversing door 18 (the upper door 18 in the drawing) will project downwardly towards the port side of the exhaust assembly. The pivotal axis of the reversing doors 18 and of the arms 57 is indicated in FIGURE 3 at C.

In order to synchronise the movements of the reversing door 18, their operating arms 57 are connected by links 58 to a cross-head 59 running in a guide 60.

The cross-head 59 has a rod 75 pivoted to it and the rod is slidably engaged in a spherical collar 76 received in a spherical surfaced bushing 77 secured in the end of the slide 60. The end of the rod 75 remote from the cross-head 59 co-operates with an abutment 78 on a lever 79 which is pivoted about an axis indicated at D. The lever 79 is connected by a link 80 to a movable valve member 63a of a locking and sequencing valve 63. The lever 79 also has pivoted to it a link 81 which is connected to an interlock cam 82 which will be described more fully below. The interlock cam 82 is pivoted about the axis C (see FIGURE 3).

When the movable member 63a of the locking and sequencing valve 63 is in the position indicated in the drawing, the abutment 78 is in the path of movement of the rod 75 and the cross-head 59 is prevented from moving to the left so that the operating arms 57 of the reversing doors 18 are prevented from moving. On movement of the valve member 63a to the left from its position shown in the drawing, the abutment 78 is moved clear from the end of the rod 75 so permitting displacement to the left of the cross-head 59. It will thus be clear that, until the abutment 78 is out of the path of the rod 75, the operating arms 57 of the reversing doors 18 cannot be moved from the full line position shown in the drawings. Also once the abutment 78 has moved clear of the rod 75 and the reversing doors 18 have been moved to the chain line positions (FIGURE 1) so that the cross-head 59 has moved to the left from the position shown, the lever 79 cannot be rocked back to the position in which it is shown in FIGURE 2. Thus the abutment 78 also acts to prevent movement of the valve member 63a of the locking and sequencing valve 63 from its left-hand position into the position shown in FIGURE 2 until the cross-head has moved to the right, i.e. until the reversing doors 18 are in the full line position of FIGURE 1.

Referring again to FIGURE 3, the control mechanism also comprises a feed-back cam 83 which is also pivoted about the axis C and is connected to the lower of the two operating arms 57 shown in FIGURE 3, which arm moves with the upper reversing door 18 of FIGURE 1. Thus, as the reversing doors 18 are moved from their full line positions to their chain line positions of FIGURE 1, the feed-back cam 83 is moved in a clockwise direction and on movement of the reversing doors 18 from their chain line position to their full line position the feed-back cam 83 is moved in an anti-clockwise direction. The feed-back cam 83 has a cam surface 83a which co-operates with one or other of a pair of rollers 84, 85 carried by the selector valve cam 44.

The interlock cam 82 (FIGURES 2 and 3) is arranged to co-operate with a projection 86 on the selector valve cam 44. For this purpose the interlock cam 82 has an arcuate slot 82a which in some positions of the selector valve cam 44 is aligned with the projection 86, a pair of abutment surfaces 82b, 82c, one on each side of the mouth of the slot 82, a projection 82d and a nose 82e at the junction of the slot 82a and the abutment surface 82c.

The interlock cam 82 has connected to it a plunger 92 projecting into a housing 93 pivoted to fixed structure 94 and the housing 93 contains a spring urging the plunger 92 to the left.

The rams 54 are divided by their pistons 55 into two air spaces 54a, 54b and the spaces 54a are fed at the appropriate times with pressure air through the pipe 61 leading from the selector valve 49, there being branches 61a from pipe 61 leading to each of the rams 54. The cylinders of each twin ram 54 are interconnected at each end by ports 54c. The spaces 54b of the rams are supplied with pressure air at the appropriate times by pipes 62, the supply being under control of the locking and sequencing valve 63. One of the branches 61a of the pipe 61 is shown as passing through the locking and sequencing valve 63.

Each of the nacelle doors 25 is operated by a pair of rams 64 connected with the forward pair of links 26a. Only one ram 64 of each nacelle door is shown in FIGURE 2. Each of the rams 64 is divided by a piston 66 into a pair of cylinder spaces 64a, 64b and the spaces 64a are connected together by piping 65 which is also shown as passing through the locking and sequencing valve 63. The spaces 64b are fed with pressure air through the pipes 71 and 72.

The pistons 66 of the rams 64 have each a piston rod 67 connected through a toggle link 102 to an operating arm 103 connected with the associated link 26a.

The piston rod 67 of one ram 64 of each pair of these rams is hollow and a tube 68 secured to the forward end of the ram 64 projects centrally along the ram 64 into the hollow piston rod 67. The hollow piston rod 67 has adjacent its rearward end a port 69 which is positioned so that when the ram piston 66 moves to the left it comes into register with a port 70 in the rearward end of the ram cylinder.

The port 70 of the uppermost ram 64 shown in FIGURE 2 is connected by a pipe 71a to the pipe 71. The end of the tube 68 of this ram is connected by a pipe 88 to the port 70 of the lowermost ram shown in FIGURE 2, whilst the tube 68 of the lower ram is connected by a pipe 89 to a chamber 63b at the right-hand end of the locking and sequencing valve 63. Thus it will be clear that until the port 69 of each of the two rams 64 has registered with its associated port 70, pressure air cannot reach the chamber 63b.

The locking and sequencing valve 63 is divided into four chambers, viz: the chamber 63b above referred to, a chamber 63c which in the position of valve member 63a shown is connected through pipe 73 to the selector valve 49, a chamber 63d which is open to atmosphere through ports 63f in the valve member 63a and in the position of the valve member 63a shown is in communication with the pipes 62, and a chamber 63e into which open the pipes 65 and 61a.

The Operation

The control lever 27, the reversing doors 18, the nacelle doors 25 and the parts of the control mechanism above described are all shown in positions corresponding to normal thrust and idling of the engine.

To obtain an increase in normal thrust, the control lever 27 is moved to the left in slot 29 so increasing the fuel supply to the engine. During this movement, the selector valve cam 44 moves clockwise so that the roller 45 runs on the cam surface 44c and thus the position of the selector valve 49 is unaltered. Also the projection 86 enters slot 82a of interlock cam 82 so preventing its rotation and thus displacement of the locking and sequencing valve member 63a. In this position of the parts pressure air is fed from the selector valve 49 through the pipe 61 and branches 61a, chamber 63e of the locking and sequencing valve 63 and pipes 65 to the spaces 54a and 64a of the rams 54 and 64, so that the respective ram pistons 55 and 66 are held in the position shown. The ram spaces 64b are vented to atmosphere through pipes 71, 72 and 73, and the drillings 49f of the selector valve 49, and ram spaces 54b are vented to atmosphere through pipe 62, chamber 63d and ports 63f.

If now reverse thrust is required, the control lever 27 is moved to the idling position so bringing projection 86 on the selector valve cam 44 clear of slot 82a and is then moved along the step 30 of the gate 28 to a position corresponding to 20%–50% reverse thrust. The percentage is fixed for any given profile 83a of arm 83, the percentage may be altered by changing the cam or cam profile. This limited movement of lever 27 and the consequent anti-clockwise movement of selector cam 44 is permitted by the clearance between roller 84 and cam face 83a seen in FIGURE 3. However movement of lever 27 and cam 44 to the full power position in slot 30 is prevented at this time by abutment of roller 84 on the cam face 83a. On such anti-clockwise movement of the selector cam 44, the selector valve member 49a is moved to the left so venting spaces 54a of rams 54 to atmosphere through pipes 61, 61a and connecting the pipes 71, 72, 73 to the pressure air supply. Pressure air is thus supplied to the spaces 64b of the rams 64 operating the nacelle doors 25, whilst the spaces 64a of these rams are vented to atmosphere through pipe 65, chamber 63e of the locking and sequencing valve 63, and pipes 61a and 61. The ram pistons 66 thus move to the left opening the nacelle doors 25.

When all the ram pistons 66 reach the left-hand ends of their travel and thus both nacelle doors 25 are fully open, the ports 69 in the piston rods 67 come opposite the ports 70 in the ram bodies so that pressure air may now flow from the pipe 71 through the branch 71a, tube 68 of the upper ram 64, pipe 88, port 70 of the lower ram 64, tube 68 of the lower ram 64 and pipe 89 into chamber 63b of the locking and sequencing valve 63. The pressure loadings on the valve member 63a of this valve are now unbalanced and the valve member 63a moves to the left so placing the end of pipe 73 in communication with the chamber 63b. The pipes 62 are also placed in communication with the chamber 63b, and the lever 79 is rocked to carry abutment 78 clear of the end of the rod 75. Since pipes 62 are placed in communication with chamber 63b, they are now fed with pressure air which flows to the spaces 54b of the rams 54 and since the spaces 54a are already vented to atmosphere through pipes 61a and 61, the pistons 55 are moved to the left so rocking the operating arms 57 and moving the reversing doors 18 from the full line position of FIGURE 1 into their chain line position.

It will be seen that in this way the nacelle doors 25 are opened fully before the reversing doors 18 commence to move towards the position in which they block the flow of gas to the nozzle 15, 16 and permit the gas to flow into the ducts leading to the porting 21.

On movement to the left of the valve member 63a, the interlock cam 82 is rotated clockwise bringing cam face 82b opposite projection 86 so preventing the selector valve cam 44 from being moved clockwise into positions corresponding to normal thrust settings of the lever 27.

Movement of the control lever 27 to the maximum power position in the reverse thrust slot portion 30 is prevented as above described until the reversing means has fully reached the chain line positions of FIGURE 1 by the roller 84 coming up against the cam face 83a of the feedback cam 83. As the reversing doors 18 move into their chain line position, the feed-back cam 83 is rotated clockwise until it is clear of the roller 84, whereafter the lever 27 can be moved fully along the length of the slot 30 to the maximum power setting. Also when the reversing doors 18 reach their chain line position, the feed-back cam 83 comes opposite the roller 85 so preventing clockwise rocking of the selector valve cam 44 past the position corresponding to the idling setting of the lever 27; thus normal thrust cannot be selected with the reversing doors 18 in the reverse thrust position.

In order to obtain normal thrust starting with the parts in their reverse thrust settings, the lever 27 is moved to the idling setting shown, so rotating the selector valve cam 44 clockwise and displacing the selector valve member 49a to the position of FIGURE 2. This movement of valve member 49a vents ram spaces 54b to atmosphere through pipes 62, chamber 63b and pipe 73, and also vents ram spaces 64b through pipes 71, 72; further the ram spaces 54a are fed with pressure air through pipes 61, 61a, but ram spaces 64a remain vented through pipes 65 and chamber 63d which in the left hand position of valve member 63a is connected with pipes 65. The ram pistons 55 thus move to the right rocking arms 57 to move the reversing doors to close off porting 17 and in this movement the rod 75 is drawn to the right clear of the abutment 78, so permitting pressure air in the chamber 63e to move the valve member 63a to the right. This movement of valve member 63a returns the abutment 78 and interlock cam 82 back to the positions shown. Also during movement of the reversing doors 18, the feed back cam 83 is moved clear of roller 85 and is brought into co-operation with roller 84.

The pilot may now obtain increased normal power if required.

Movement of the valve member 63a to the right also connects pipes 65 with the chamber 63e which is pressurised, and thus pressure air may now reach the ram spaces 64a so moving the ram pistons 66 to the right and closing the nacelle doors 25.

It will be clear from the foregoing description (a) that with normal thrust selected and the reversing doors 18 in the reverse thrust position, the lever 27 cannot be moved in slot 29 beyond the idling position since if such movement is attempted roller 85 abuts cam surface 83a;

(b) that with normal thrust selected, inadvertent movement of the reversing doors 18 towards the reverse thrust position will automatically return the lever 27 to the idling setting, this being effected by cam face 83a of the follow up cam 83 bearing on the roller 85 so rotating selector valve cam 44 and rocking lever 27 through link 43, lever 42, link 41, gears 35, 34 and drive 33, 32;

(c) that with reverse thrust selected and the reversing doors 18 in the normal thrust position, the lever 27 cannot be moved in slot 30 beyond a 20% to 50% setting (the actual percentage value depending on the shape of the portion of cam surface 83a cooperating with roller 84), (d) that with reverse thrust selected, inadvertent movement of the reversing doors 18 from the reverse thrust position to the normal thrust position will result in the feed-back cam 83 engaging roller 84 and rotating selector valve cam 44 clockwise and thus moving the lever 27 towards the idling setting;

(e) that whilst the locking and sequencing valve member 63a is in its left hand position, cam surface 82b of the interlock cam 82 prevents projection 86 from entering slot 82a so preventing movement of lever 27 in slot 29 beyond the idling position;

(f) that, when the lever 27 is in slot 29 beyond the idling position, projection 86 is in slot 82a and the interlock cam 82 cannot move so preventing movement of valve 63a to disengage abutment 78 from the rod 75;

(g) that, if the connection between cam 82 and valve member 63a fails with the lever 27 in the idling normal thrust position, the cam 82 is rotated anti-clockwise by spring-load plunger 92 and the nose 82e engages above projection 86 so enabling normal thrust movement of lever in slot 29, (h) that, if the connection between cam 82 and valve member 63a fails, the failure is detected when reverse thrust is selected; the projection 86 mill move clear of nose 82e and the interlock cam 82 will rotate to engage stepped surfaces 82c, 82d with the projection 86 and thus will prevent normal thrust from being subsequently obtained so indicating the fault.

In the arrangement shown, the nacelle doors 25 are provided with spring loaded catches 96 to hold the doors in the closed position, the catches co-operating with the ends of the rods 67 of their operating rams 64.

A series of five warning light switches are also provided, one switch 97 being carried by each toggle link 72 and one switch 98 carried on one of the cross ties 56. These switches 97, 98 are closed as soon as the associated ram piston 66 or 55 starts to move to the left (i.e. towards the reverse thrust position). Each switch completes a circuit containing a warning light 99.

In a modification of the above arrangement the interlock cam 82 and link 81 are omitted and the switch 98 is moved so that instead of being actuated by the cross member 56 carried by the piston rods 55a of the reverser rams 54 it is actuated by the lever 79 associated with the locking and sequencing valve 63. The switch is operated by a toggle device carried on lever 79, the toggle device also acting as a catch to engage stationary structure and hold the lever 79 in the position shown in FIGURE 2, i.e. the forward thrust position. It is arranged that immediately the catch is disengaged, even though lever 79 has not moved sufficiently for the abutment 78 to move out of the path of the rod 75 of the cross-head 58, the switch is closed to light the warning light 99.

Figure 4:
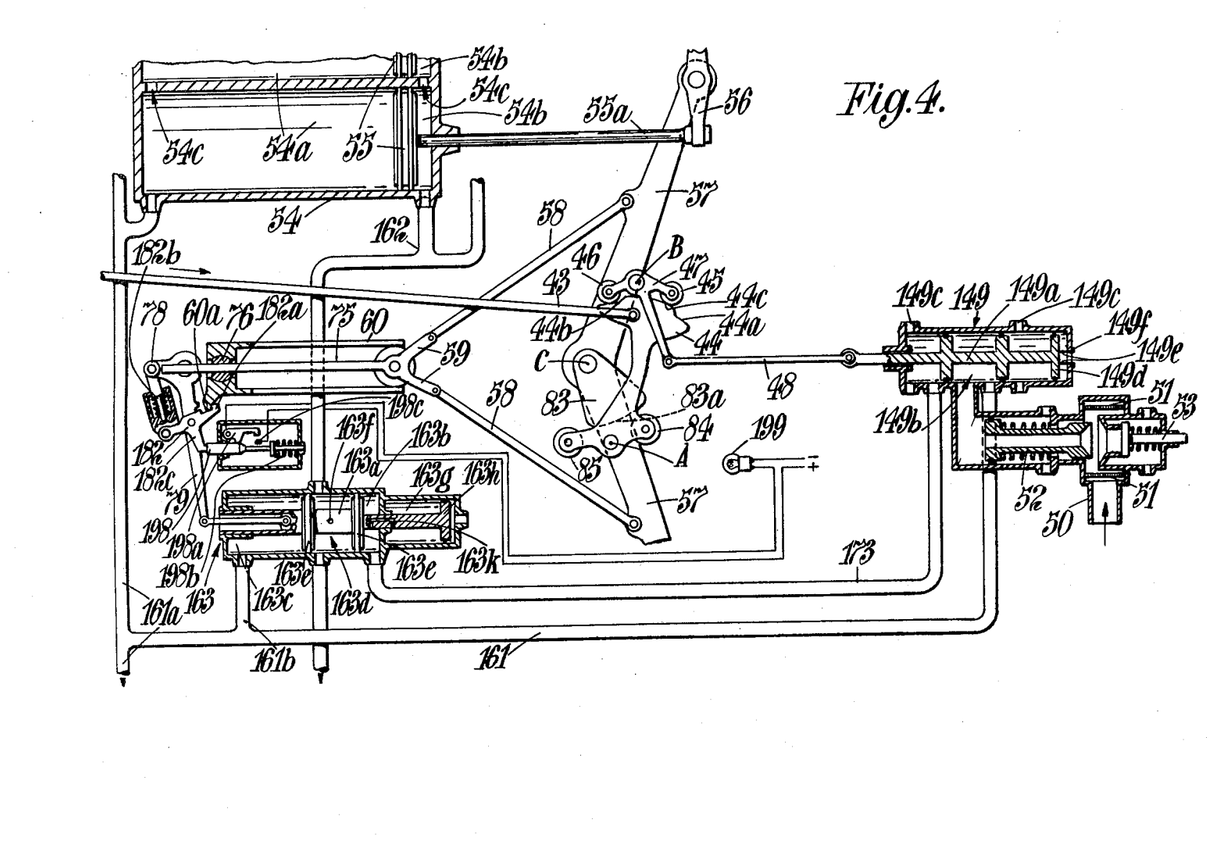
FIGURE 4 illustrates a second embodiment.

Referring now to FIGURE 4, there is shown part of a control mechanism which is basically similar to the control mechanism just described, but which is modified for use when no nacelle doors 25 are provided and thus also when there are no rams 64. The same references are used in FIGURE 4 to indicate elements of the control which are unmodified as compared with FIGURES 1 to 3.

In this arrangement, the selector valve cam 44 and feed-back cam 83 are of the same form and are operated in the same way as in FIGURES 2 and 3, but the interlock cam 82 is eliminated.

The reversing doors are again operated by twin rams 54, the ram spaces 54a being supplied with pressure air through pipes 161, 161a and the spaces 54b being supplied via pipes 162 under control of the locking and sequencing valve 163.

The selector valve 149 is somewhat modified and has a movable valve member 149a, an air inlet port 149b from the pressure limiting valve 52 and a pair of vents 149c to atmosphere. In the position of the valve member 149a shown inlet port 149b communicates with pipe 161, the left hand vent 149c being connected to a pipe 173 leading to valve 163. When the valve member 149a is moved to the left, the pressure air inlet 149b is placed in communication with pipe 173 and pipe 161 is vented to atmosphere via the right hand vent 149c.

The valve member 149a also has a land 149d to act as a movement damping piston, and carries a pair of spring fingers 149e having nibs 149f at their ends to engage the valve casing and to act as a spring loaded detent tending to hold the valve member in the position shown.

The cross-ties 56 of the rams 54 are as in FIGURE 2 linked to the cross-head 59 actuating the rod 75, movement of which from the position shown is baulked by the abutment 78 carried by the lever 79 which is connected to be operated by movement of the locking and sequencing valve 163. This valve has its movable member 163a connected to move the lever 79 and comprises an end chamber 163b joined to the pipe 173, a second end chamber 163c joined by pipe 161b to the pipe 161 and a space 163d between the two chambers and bonded by lands 163e on the member 163a. The space 163d is open to atmosphere through vent 163f and is, when the valve member 163a is in the position shown, in communication with pipes 162 joining space 54b of the rams 54.

The valve 163 also comprises a dash-pot consisting of a chamber 163g housing a piston extension 163h of the valve member 163a, the chamber 163g being, during part of the travel of the piston 163h, connected by a restricted passage 163k to chamber 163b.

The lever 79 has pivoted on it a latch 182 having a first arm formed with a hooked end 182a to engage behind a catch 60a on fixed structure, a second arm connected to the lever 79 by a resilient link 182b tending to hold the hooked end 182a in engagement with the catch 60a, and a third arm 182c engaging a spring-loaded plunger 198 for operating a movable contact 198a of an electric switch. When the plunger 183 is depressed against its spring 198b (as shown), the movable contact 198a is rocked clear of a fixed contact 198c; the switch contacts are joined in the circuit of a pilot's warning light 199.

The operation of the control mechanism is similar to that of the control mechanism shown in FIGURES 2 and 3, except that there is no sequencing of the opening and closure of two sets of doors.

Thus to change from normal thrust to reverse thrust the selector cam 44 is rocked anti-clockwise from the position shown so rocking the lever 47 clockwise and drawing the selector valve member 149a to the left. Before such adjustment of the selector valve member 149a, the pipe 161 is fed with presure air and pipe 173 is vented to atmosphere so that the ram pistons 55 and the sequencing valve member 163a are held in the positions shown by pressure air acting on their left-hand ends. On movement of the valve 149a, to the left, pressure air is fed to pipe 173 and pipe 161 is vented to atmosphere. Thus the left-hand sides of the pistons 55 and valve member 163a are vented and the right-hand side of the valve member 163a is fed with pressure air, the right-hand sides of pistons 55 being still vented to atmosphere through vent 163f. The valve member 163a now moves to the left, its rate of movement being limited by the associated dash-pots 163g—163k; during the initial movement of the valve member 163a, which rocks lever 79 clockwise, the hooked end 182a of the latch is drawn clear of catch 60a and immediately the contact 198a engages the fixed contact 198c so completing the circuit of the warning light 199. Also due to rocking of lever 79 during this initial travel of the valve member 163a, the abutment 78 is moved from the path of the rod 75 so freeing it for movement. Towards the end of the left-hand travel of the valve member 163a, the right-hand land 163e passes over the entry point of the pipe 162 so connecting the pipe to chamber 163b to receive pressure air which is thus fed to the ram spaces 54b causing the pistons 55 to move to the left and swinging of the reverser doors 18 to the chain line position (FIGURE 1). During this movement the cross-head 59 travels to the left and the rod 75 moves below the abutment 78 to lock the valve member 163a against movement of the right.

Movement of the reverser doors, rotates the follow-up cam 83 clockwise into line with the roller 85, so (a) freeing the selector valve cam 44 for further anti-clockwise movement as the engine throttle is moved towards full power in the reverse thrust slot of the throttle gate, and (b) baulking clockwise movement of the selector valve cam 44 and thus preventing the throttle lever being moved in its forward thrust slot of the gate beyond the idling setting.

In the event that, during reverse operation the reverser doors move inadvertently towards their forward thrust position, cam 83 engages roller 84 and automatically winds the throttle lever back towards the low power end of the reverse thrust slot of the gate.

To change from reverse thrust to forward thrust, the throttle lever is moved to its idling setting in the forward thrust slot of its gate, so moving the selector valve cam 44 and the selector valve member 149a back to the positions shown. Thus pipe 173 is vented to atmosphere and pipe 161 is connected to the pressure air supply so that both ram spaces 54a and the left-hand end of the valve member 163a are subjected to the pressure air, the ram spaces 54b and the right hand end of valve member 163a being vented. The ram pistons 55 now move to the right restoring the cam 83, the cross-head 59 and rod 75 to the positions shown and moving the reverser doors to the full-line position of FIGURE 1. At the end of its movement the rod 75 clears the abutment 78, so allowing the valve member 163a to move to the right under the air pressure load thereby restoring the parts 163a, 79, 78, 182 to the position shown and moving the moving switch contact 198a clear of the fixed contact 198c.

It will be clear that as soon as the cam 44 moves out of the path of roller 85, the engine throttle can be moved towards the full power end of its forward thrust slot.

With the cam 44 in the position shown, inadvertent movement of the reverser doors towards the reverse thrust position winds the engine throttle back to the idling position in its forward thrust slot.

We claim:

1. In combination an aircraft jet-propulsion means including an engine having fuel supply means and an exhaust assembly, said exhaust assembly including a rearwardly-facing propulsion nozzle through which exhaust gases emerge to atmosphere to produce a propulsive jet and jet-reversing means adjustable between a normal thrust position in which exhaust gas is free to flow rearwardly through the propulsion nozzle and a reverse thrust position in which the exhaust gas is intercepted and deflected to emerge to atmosphere as a forwardly-directed jet for braking purposes, and control mechanism comprising a fuel control lever adjustable to vary the fuel supply and having an idling setting and two ranges of movement from the idling setting respectively for engine operation with normal thrust and for engine operation with reverse thrust, power means connected to adjust the jet-reversing means between the normal and reverse thrust positions, selector means including a selector cam connected to the fuel control lever to be rotated on adjustment of the fuel control lever from a first position, which corresponds to the idling setting of the fuel control lever, in one sense on increasing the fuel supply for normal thrust operation and in the opposite sense on increasing fuel supply for reverse thrust operation, a normal thrust setting of the jet-reversing means being selected when the jet-reversing means is in its reverse thrust position, by adjustment of the fuel control into its idling position and reverse thrust being selected, when the reversing means is in its normal thrust position, by adjustment of the fuel control lever in the reverse thrust range of its movement to a limited extent from the position corresponding to idling setting, and limiting means cooperating with the selector cam and limiting movement of said selector cam away from the first position except when the jet-reversing means is substantially in its selected position, said limiting means including a follow-up cam connected to be rotated by the jet-reversing means in moving from one of its positions to the other, said selector and follow-up cams cooperating one with the other to limit rotation of the selector cam from said first position thereof and thus of the fuel control lever from its idling setting in its normal thrust range until the reversing means is in the forward thrust position and in the reverse thrust range beyond said limited extent until the reversing means is in the reverse thrust position, the selector cam also initiating adjustment of the jet-reversing means.

2. The combination according to claim 1, wherein the selector cam carries a pair of rollers which are displaced angularly on rotation of the selector cam, and the follow-up cam is rotated by adjustment of the reversing means from the path of one roller into the path of the other roller.

3. The combination according to claim 1, wherein the selector cam by its movement adjusts a selector valve supplying pressure fluid to operating rams for actuating the reversing means.

4. In combination an aircraft jet-propulsion means including an engine having fuel supply means and an exhaust assembly, said exhaust asembly including a rearwardly-facing propulsion nozzle through which exhaust gases emerge to atmosphere to produce a propulsive jet and jet-reversing means adjustable between a normal thrust position in which exhaust gas is free to flow rearwardly through the propulsion nozzle and a reverse thrust position in which the exhaust gas is intercepted and deflected to emerge to atmosphere as a forwardly-directed jet for braking purposes, and control mechanism comprising a fuel control lever adjustable to vary the fuel supply and having an idling setting and two ranges of movement from the idling setting respectively for engine operation with normal thrust and for engine operation with reverse thrust, power means connected to adjust the jet-reversing means between the normal and reverse thrust positions, selector means including a selector cam connected to the fuel control lever to be rotated on adjustment of the fuel control lever from a first position, which corresponds to the idling setting of the fuel control lever in one sense on increasing the fuel supply for normal thrust operation and in the opposite sense on increasing fuel supply for reverse thrust operation, and limiting means cooperating with the selector cam and limiting movement of said selector cam away from the first position except when the jet-reversing means is substantially in its selected position, said limiting means including a follow-up cam connected to be rotated by the jet-reversing means in moving from one of its positions to the other, said selector and follow-up cams cooperating one with the other to limit rotation of the selector cam from said first position thereof and thus of the fuel control lever from its idling setting except when the jet-reversing means is adjacent its position corresponding to the range in which the fuel control lever is to be moved, the selector cam also initiating adjustment of the jet-reversing means, and said follow-up cam also cooperating with said selector cam on occurrence of unselected movement of the reversing means to rotate the selector cam towards said first position thereof and thus to move the fuel control lever towards its idling position.

5. In combination an aircraft jet-propulsion means including an engine having fuel supply means and an exhaust assembly, said exhaust assembly including a rearwardly-facing propulsion nozzle through which exhaust gases emerge to atmosphere to produce a propulsive jet and jet-reversing means adjustable between a normal thrust position in which exhaust gas is free to flow rearwardly through the propulsion nozzle and a reverse thrust position in which the exhaust gas is intercepted and deflected to emerge to atmosphere as a forwardly-directed jet for braking purposes, and control mechanism comprising a fuel control lever adjustable to vary the fuel supply and having an idling setting and two ranges of movement from the idling setting respectively for engine operation with normal thrust and for engine operation with reverse thrust, power means connected to adjust the jet-reversing means between the normal and reverse thrust positions, selector means including a selector cam connected to the fuel control lever to be rotated on adjustment of the fuel control lever from a first position, which corresponds to the idling setting of the fuel control lever in one sense on increasing the fuel supply for normal thrust operation and in the opposite sense on increasing fuel supply for reverse thrust operation, and limiting means cooperating with the selector cam and limiting movement of said selector cam away from the first position except when the jet-reversing means is substantially in its selected position, said limiting means including a follow-up cam connected to be rotated by the jet-reversing means in moving from one of its positions to the other, said selector and follow-up cams cooperating one with the other to limit rotation of the selector cam from said first position thereof and thus of the fuel control lever from its idling setting except when the jet-reversing means is adjacent its position corresponding to the range in which the fuel control lever is to be moved, the selector cam also initiating adjustment of the jet-reversing means, a pair of rollers carried by the selector cam each to be displaced in an angular path on rotation of the selector cam, the following cam on rotation by the reversing means moving from the angular path of one roller into the angular path of the other roller and the follow-up cam also cooperating with the rollers on the selector cam, in the event of non-selected movement of the jet-reversing means, to drive the selector cam towards its first position so moving the fuel control lever towards its idling setting.

6. In combination an aircraft jet-propulsion means including an engine having fuel supply means and an exhaust assembly, said exhaust assembly including a rearwardly-facing propulsion nozzle through which exhaust gases emerge to atmosphere to produce a propulsive jet and jet-reversing means adjustable between a normal thrust position in which exhaust gas is free to flow rearwardly through the propulsion nozzle and a reverse thrust position in which the exhaust gas is intercepted and deflected to emerge to atmosphere as a forwardly-directed jet for braking purposes, said jet-reversing means comprising reversing doors movable into the gas flow through the jet pipe to obtain reverse thrust and movable out of the gas flow to obtain normal thrust, pressure-fluid-operated rams connected to adjust the reversing doors, and control mechanism comprising a fuel control lever adjustable to vary the fuel supply and having an idling setting and two ranges of movement from the idling setting respectively for engine operation with normal thrust and for engine operation with reverse thrust, power means connected to adjust the jet-reversing means between the normal and reverse thrust positions, selector means including a selector cam connected to the fuel control lever to be rotated on adjustment of the fuel control lever from a first position, which corresponds to the idling setting of the fuel control lever, in one sense on increasing the fuel supply for normal thrust operation and in the opposite sense on increasing fuel supply for reverse thrust operation, and limiting means cooperating with the selector cam and limiting movement of said selector cam away from the first position except when the jet-reversing means is substantially in its selected position, said limiting mean including a follow-up cam connected to be rotated by the jet-reversing means in moving from one of its positions to the other, said selector and follow-up cams cooperating one with the other to limit rotation of the selector cam from said first position thereof and thus of the fuel control lever from its idling setting except when the jet-reversing means is adjacent its position corresponding to the range in which the fuel control lever is to be moved, a selector valve moved by the selector cam and controlling supply of pressure fluid to the rams, an interlock and sequencing valve in supply connections between the selector valve and the rams, the interlock and sequencing valve being displaceable between normal thrust and reverse thrust positions by the pressure fluid following appropriate adjustment of the selector valve, and an interlock mechanism connected between the reversing doors and the interlock and sequencing valve such that, on adjustment of the selector valve to select reverse thrust, the pressure fluid supply to the reversing door rams is effected only after movement of the sequencing valve into the reverse thrust position and such that, on adjustment of the selector valve to select normal thrust, the rams operate to move the reversing doors to their normal thrust position before movement of the interlock and sequencing valve to its normal thrust position is permitted.

7. The combination according to claim 6, wherein the interlock mechanism comprises a cross-head coupled to and movable with the reversing doors, a lever rocked by movement of the interlock and sequencing valve and carrying an abutment which, in the normal thrust position of the valve, prevents movement of the crosshead and thus of the doors from the normal thrust position and which on movement of the valve to its reverse thrust position frees the cross-head for movement, and a part carried by the cross-head and cooperating with the abutment to prevent movement of the interlock and sequencing valve into its normal thrust position until the reversing doors have moved to the normal thrust position.

8. The combination according to claim 6, for use with reversing means having nacelle doors covering reverse thrust gas outlets in a nacelle enclosing the reversing means, which nacelle doors are open in reverse thrust operation and are closed in forward thrust operation, wherein there are further rams for actuating the nacelle doors, the nacelle door rams and the interlock and sequencing valve being so connected to the selector valve that, on adjustment of the selector valve to select reverse thrust, the pressure fluid supply to move the interlock and sequencing valve is effected by movement of the nacelle doors to their open position and that, on adjustment of the selector valve to select normal thrust, the supply of pressure fluid to the nacelle door rams is effected by movement of the interlock and sequencing valve from its reverse thrust position.

9. The combination according to claim 8, wherein at least one ram associated with each of the nacelle doors is arranged on reaching its door open setting to bring into register a pair of ports, the pairs of ports being in series in a supply connection from the selector valve to the interlock and sequencing valve, whereby each nacelle door is open before the interlock and sequencing valve is moved to its reverse thrust position and before the reversing doors are moved into the gas flow.

10. The combination according to claim 9, wherein each said ram of a nacelle door has a hollow piston rod, one port of the pair of ports being adjacent one end of the rod and open to the interior of the piston rod and the other port of the pair being in fixed structure, the hollow piston forming a portion of the supply connection, and the hollow piston rods being connected together in series between the selector valve and the interlock and sequencing valve.

11. The combination according to claim 6 comprising also an interlock cam connected to be rocked by movement of the interlock and sequencing valve and co-operating with the selector cam so that the selector cam is prevented from rotating in said one sense beyond its idling setting when the interlock and sequencing valve is in its reverse thrust setting and is prevented from rotating from its normal thrust setting when the lever arrangement is in any setting in the normal thrust range of its adjustment other than the idling setting.

References Cited in the file of this patent
UNITED STATES PATENTS

| | | |
|---|---|---|
| 2,664,959 | Stuart | Jan. 5, 1954 |
| 2,932,164 | Watson | Apr. 12, 1960 |
| 2,938,683 | Morrison | May 31, 1960 |
| 2,945,347 | Colley | July 19, 1960 |